United States Patent
McGowan et al.

(10) Patent No.: US 12,367,474 B2
(45) Date of Patent: Jul. 22, 2025

(54) SYSTEM, METHOD AND APPARATUS FOR PROVIDING VOLUNTARY DOWN PAYMENTS FOR ONLINE PURCHASES BASED ON CREDIT

(71) Applicant: Affirm, Inc., San Francisco, CA (US)

(72) Inventors: Henry McGowan, New York, NY (US); Nitesh Kumar, San Francisco, CA (US); Jesse Kendrick, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 143 days.

(21) Appl. No.: 18/070,790

(22) Filed: Nov. 29, 2022

(65) Prior Publication Data
US 2024/0177133 A1    May 30, 2024

(51) Int. Cl.
  *G06Q 20/24* (2012.01)
  *G06Q 20/12* (2012.01)

(52) U.S. Cl.
  CPC ............ *G06Q 20/24* (2013.01); *G06Q 20/12* (2013.01)

(58) Field of Classification Search
  CPC .......................... G06Q 20/24; G06Q 20/12
  See application file for complete search history.

(56) References Cited

U.S. PATENT DOCUMENTS

| | | | |
|---|---|---|---|
| 8,041,606 B2 | 10/2011 | Mascavage, III et al. | |
| 8,386,327 B2 | 2/2013 | Blackhurst et al. | |
| 8,538,827 B1 | 9/2013 | Dryer et al. | |
| 8,538,870 B2 | 9/2013 | Allen-Rouman et al. | |
| 10,121,130 B2 | 11/2018 | Pinski et al. | |
| 10,846,670 B2 | 11/2020 | Chawla et al. | |
| 11,151,646 B1 | 10/2021 | Simon | |
| 11,222,335 B2 | 1/2022 | Dhar et al. | |
| 11,250,503 B1 * | 2/2022 | Jew | G06F 3/04847 |
| 11,321,707 B2 | 5/2022 | Chitalia et al. | |
| 2018/0053249 A1 | 2/2018 | Gokhale et al. | |
| 2018/0225748 A1 | 8/2018 | Selcuk et al. | |
| 2021/0282672 A1 * | 9/2021 | Kumar | G16H 40/67 |

FOREIGN PATENT DOCUMENTS

CN    109191102 A    1/2019

OTHER PUBLICATIONS

Extended European Search Report from corresponding European Application No. 23210645.0 mailed Jan. 22, 2024, all pages cited in its entirety.

* cited by examiner

*Primary Examiner* — Scott S Trotter
(74) *Attorney, Agent, or Firm* — Burr & Forman LLP

(57) ABSTRACT

A method for providing a voluntary down payment interface in association with a financing offer may include providing, to a remote device of a customer in association with a transaction between a merchant and the customer, an indication of a financing offer associated with a loan, providing, on a same page or screen of the remote device as the indication of the financing offer, a selectable option to display a down payment selector interface for making the voluntary down payment, responsive to the selectable option being selected, displaying the down payment selector interface, and, responsive to the selectable option not being selected, hiding or not displaying the down payment selector interface.

18 Claims, 9 Drawing Sheets

SYSTEM, METHOD AND APPARATUS FOR PROVIDING VOLUNTARY DOWN PAYMENTS FOR ONLINE PURCHASES BASED ON CREDIT

TECHNICAL FIELD

Example embodiments generally relate to financial industry technologies and, in particular, relate to apparatuses, systems, and methods for enabling consumers to obtain credit in relation to purchasing goods or services online, while making voluntary down payments.

BACKGROUND

The financial industry is comprised of many thousands of customers, vendors, lenders, borrowers, and other role players that all interact in various ways to enable customers to ultimately have access to goods and services provided by the vendors. Credit and debit transactions have long been a way that individuals have managed point of sale transactions to ensure relatively seamless transfer of funds from customers, or on their behalf, to vendors for relatively routine or small transactions. Meanwhile, obtaining a loan from a bank has long been the most common way of obtaining financing for non-routine or larger transactions. More recently, installment loans have become a popular option.

In many cases, a customer may interact with a vendor or lender to work through a transaction that ultimately provides the vendor with the necessary funds to complete the transaction. For typical purchases for which financing is desired using online resources, it is normally the case that the entire cart or transaction amount is financed according to a single financing offer, which could be a selected one of multiple offers. Thus, when the customer selects a financing offer, the details of the offer itself are typically fixed and not able to be modified to any significant degree. Moreover, if the customer does not qualify for financing of the total amount, the ability to finance the transaction at all may be foreclosed.

Customers would prefer to have better control of the terms of their financing. Moreover, polling data suggests that customers would also prefer to have the option to make a down payment in connection with obtaining financing online. Thus, it may be desirable to define more flexible interfaces and processing methods for obtaining financing.

BRIEF SUMMARY OF SOME EXAMPLES

Accordingly, some example embodiments may enable the provision of technical means by which to provide a foundation for enabling improved financing options at (and on the way to) checkout.

In an example embodiment, a method for providing a voluntary down payment interface in association with a financing offer may be provided. The method may include providing, to a remote device of a customer in association with a transaction between a merchant and the customer, an indication of a financing offer associated with a loan, providing, on a same page or screen of the remote device as the indication of the financing offer, a selectable option to display a down payment selector interface for making the voluntary down payment, responsive to the selectable option being selected, displaying the down payment selector interface, and, responsive to the selectable option not being selected, hiding or not displaying the down payment selector interface.

In another example embodiment, an apparatus for providing a voluntary down payment interface in association with a financing offer may be provided. The apparatus may include processing circuitry configured for providing, to a remote device of a customer in association with a transaction between a merchant and the customer, an indication of a financing offer associated with a loan, providing, on a same page or screen of the remote device as the indication of the financing offer, a selectable option to display a down payment selector interface for making the voluntary down payment, responsive to the selectable option being selected, displaying the down payment selector interface, and, responsive to the selectable option not being selected, hiding or not displaying the down payment selector interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
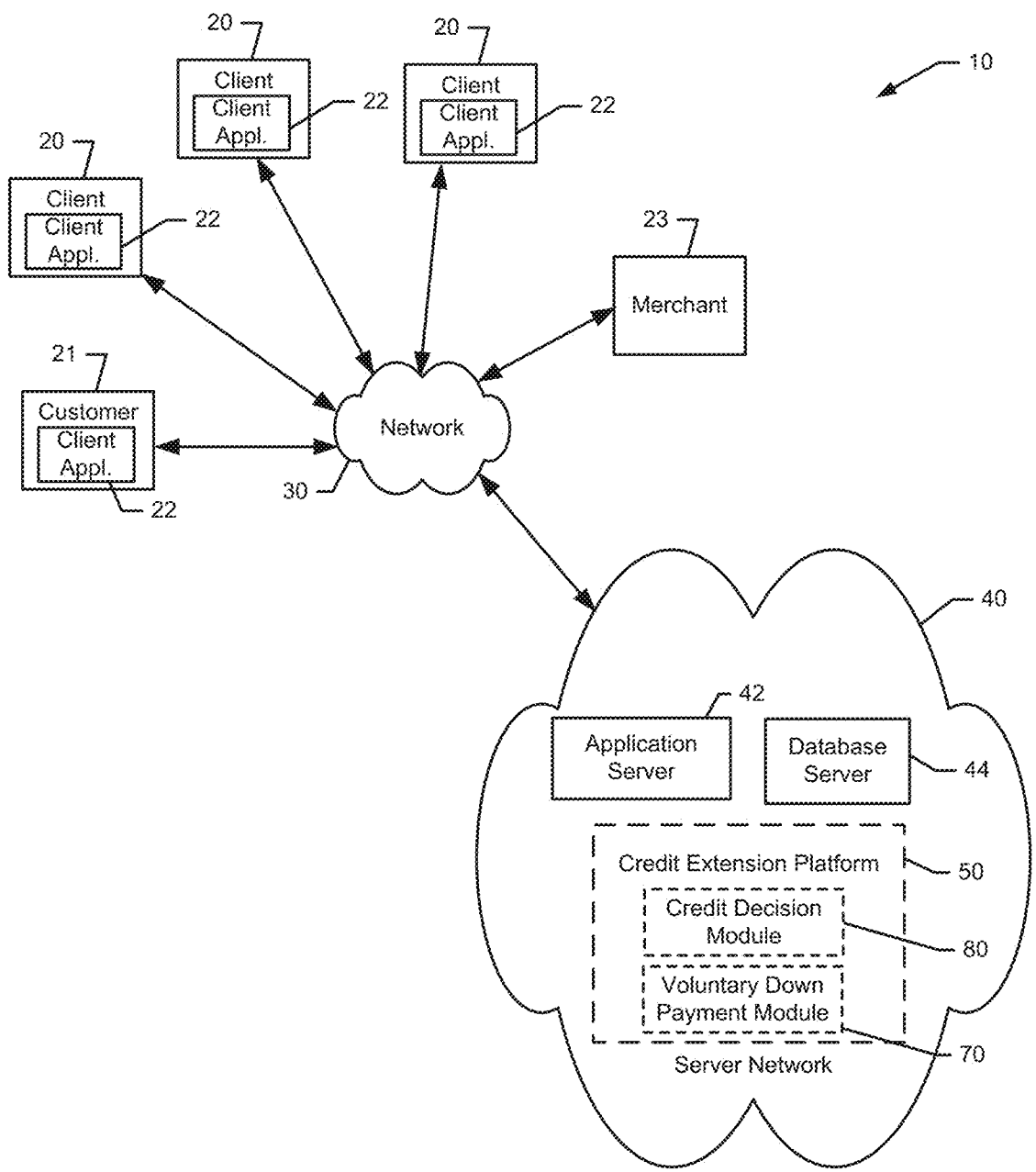
FIG. 1 illustrates a functional block diagram of a system for providing a voluntary down payment interface in association with a financing offer according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As noted above, the typical credit determination process for a customer at checkout is more or less an all or nothing process. In this regard, for example, if the customer submits a credit application for an amount (e.g., a cart total) that is above the maximum amount for which the customer can be approved (e.g., the customer's credit limit), the credit application will typically be denied. The customer can then either pay another way, or remove items to achieve a cart total that is below the credit limit. However, each of these may result in frustration for the delay while at checkout, or excessive effort that reduces the quality of the experience for the customer. Moreover, in many cases, opportunities for the lender to increase volume while the customer achieves the satisfaction of obtaining desired goods or services are lost. In other words, a potential win-win scenario is traded directly for a lose-lose scenario in which no one is satisfied.

Given the popularity of installment loans, which may in many cases provide credit without compounding interest rates (or any interest charged in some cases), some customers may prefer to have the option to use a payment method that either is or at least is convertible to an installment loan at checkout for online purchases. However, when obtaining financing, customers would nevertheless appreciate an opportunity to interface with the lender to avoid an all or nothing financing decision based on a rigid financing offer. In this regard, even if the cart total or purchase amount is greater than the amount for which the customer can obtain a loan approval, or if the customer would simply prefer to reduce the amount financed (for any reason), it would be preferable to define a technical solution that has the flexibility to deal with the eventuality and still retain the possibility of obtaining financing for some portion of the cart total.

Example embodiments may provide a technical means by which to handle the scenario described above while preserving the opportunity for mutual satisfaction of all parties involved. In this regard, example embodiments provide a user interface, and a processing algorithm for employing the same, that enables the customer to provide a voluntary down payment at checkout. The ability to provide a down payment voluntarily introduces a great deal of flexibility into the loan application process both for the lender and for the customer (i.e., borrower). For example, if the cart total or purchase amount is above the credit limit or prequalification of the customer, the lender (via the processing algorithm) may offer financing for an eligible portion of the cart total (based on the credit limit), and indicate an amount of down payment that the customer may provide to secure the financing offered. However, this flexibility may also be employed by the customer independent of financial requirements that must be met to obtain the financing in order to directly control the amount financed and the interest or other payments made to obtain the financing. This may effectively enable the customer to control terms to their own liking based on the provision of a down payment. As such, example embodiments may enable customers to be made aware of opportunities to not only obtain financing, but to provide a voluntary down payment that may be enabling or enhancing in relation to utilizing their preferred financing option (e.g., installment loans or other financing).

By employing example embodiments, customers have the freedom to control their payments and set the financed amount as the customers desire. This flexibility may remove a certain amount of transactional friction, which may itself drive additional sales and satisfaction for both customers and merchants when customers are actively engaging a merchant to purchase a product or service. Thus, a win-win situation is created for lenders, customers and merchants and, in many cases, the improvement may be accomplished without any need for the merchants to necessarily modify their checkout pages or otherwise alter the workflows associated with their websites. The lender (or a facilitation agent associated therewith) may provide the flexibility as a payment option that may integrate with or otherwise enable payment that seamlessly works with the merchants' websites.

Some example embodiments described herein provide for a credit extension platform that can be utilized in connection with a payment option facilitator instantiated at an apparatus comprising configurable processing circuitry. The processing circuitry may be configured to execute various processing functions on financial data using the techniques described herein. The credit extension platform may, for example, be configured to provide a way to enable customers to checkout in a more flexible way that gives customers greater flexibility to choose between different types of financing options not necessarily provided directly by the merchant's checkout page, and provide a voluntary down payment. The increased flexibility provided to customers may translate into more access to credit, more active customers, and better conversion rates for merchants.

Example embodiments may be employed in connection with previously conducted underwriting decisions made prior to the customer's arrival at checkout or for decisions made at time of purchase. In relation to underwriting decisions, macroeconomic conditions and seasonality may have an impact on the business of a financial institution or organization that offers the financing options described herein. In response to these factors, and various tuning efforts that may normally be employed, a transactional credit model may utilize all inputs and factors to make a credit extension decision (i.e., whether to extend credit to the user to pay for a transaction) for a customer before the customer is at checkout, or at checkout, but integrate information that may be relevant to the merchant (or services/products of the merchant) into activities the customer engages in on the way to checkout. In this regard, the transactional credit model may determine an amount of credit to offer to the customer (or user) based on the credit score of the user, the identity of the user or merchant, and numerous other factors that may or may not include specific records of past and recent transactions with a particular company in order to make the credit extension decision.

An example embodiment of the invention will now be described in reference to FIG. 1, which illustrates an example system in which an embodiment of the present invention may be employed. As shown in FIG. 1, a credit management system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The clients 20 may, in some cases, each be associated with a single computer or computing device that is capable of executing software programmed to implement example embodiments. Thus, in some embodiments, one or more of the clients 20 may be associated with an organization (e.g., a merchant company) and may be located in different business units, branch offices, or other locations. In other cases, the clients 20 may be associated with individual users (i.e., customers) that may wish to interact with other clients 20 and/or a financial institution or entity. In general, the clients 20 may be terminals or platform entities that are capable of executing example embodiments, and there could be as few as one, or a host of such terminals or entities. In the present example, one of the clients 20 may be specifically associated with a customer 21 and is therefore labeled as such. Meanwhile, another of the clients 20 may be associated with a vendor or merchant. However, in order to account for the possibility that the vendor/merchant may have no prior relationship with the system 10 (or the company or institution that instantiates the system 10), FIG. 1 illustrates more generally a merchant 23, which is a vendor/merchant that has its own computer, computing device, server, point of sale checkout device, or other communication platform capable of interacting with the system 10.

Each one of the clients 20 (including the customer 21, and in some cases also the merchant 23) may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include or be capable of executing a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing financial data as described in greater detail below.

In an example embodiment, the client application 22 may be embodied as a software module that is used to customize a web browser of the client 20, or to customize a particular interface of the client 20 to tailor the client 20 to communicate with a lender or agent thereof in the manner described herein. The customization may include, for example, modifications to the user interface of the web browser. The client application 22 may therefore include source code capable of altering browser settings, adding user interface items to web pages, or adding to/replacing website content on web pages. In some cases, the client application 22 may have access to browsing history or current/active searches conducted by the client 20.

The network 30 may be a data network, such as one or more instances of a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include many different vendors (of which the merchant 23 is one example) and one or more application servers (e.g., application server 42), and/or a database server 44, which together may form respective elements of a server network 40. Although the application server 42 and the database server 44 are each referred to as "servers," this does not necessarily imply that they are embodied on separate servers or devices. As such, for example, a single server or device may include both entities and the database server 44 could merely be represented by a database or group of databases physically located on the same server or device as the application server 42. The application server 42 and the database server 44 may include hardware and/or software for configuring the application server 42 and the database server 44, respectively, to perform various functions. As such, for example, the application server 42 may include processing logic and memory enabling the application server 42 to access and/or execute stored computer readable instructions for performing various functions.

In an example embodiment, one function that may be provided by the application server 42 may be the provision of access to information and/or services related to credit extension platform 50, and more particularly relating to facilitating financial computations and calculations related to decisions associated with extensions of credit (e.g., loans where, for example, the loans may include an installment loan, or other products associated with credit or lending transactions). For example, the application server 42 may be configured to provide (via the credit extension platform 50) execution of instructions, and storage of information descriptive of events or activities, associated with the credit extension platform 50 and the execution of a financial computations, calculations and modeling on behalf of a user of the system 10 located at one of the clients 20, or interacting with a user located at one of the clients 20, in real time. In some cases, the financial transaction may include obtaining financing (e.g., conventional loans or installment loans), and the activities associated therewith may include the provision of a loan/product application detailing information required by the lender (and operator of the credit extension platform 50) to determine whether credit, funds, or other products can be provided to the customer based on information provided in the loan/product application.

In some embodiments, the credit extension platform 50 may be a technical device, component or module affiliated with the lender or an agent of the lender. Thus, the credit extension platform 50 may operate under control of the lender or agent of the lender to be a technical means by which to carry out activities under direction of the lender/agent or employees thereof. As such, in some embodiments, the clients 20 may access the credit extension platform 50 services, and more particularly contact the credit extension platform 50 online and utilize the services provided thereby. However, it should be appreciated that in other embodiments, an application (e.g., the client application 22) enabling the clients 20 to interact with the credit extension platform 50 (or components thereof) may be provided from the application server 42 (e.g., via download over the network 30) to one or more of the clients 20 to enable recipient clients 20 to instantiate an instance of the client application 22 for local operation such that the credit extension platform 50 may be a distributor of software enabling individual users to utilize the credit extension platform 50. Alternatively, another distributor of the software may provide the client 20 with the client application 22, and the credit extension platform 50 may communicate with the client 20 (via the client application 22) after such download. In some examples, the client application 22 may be obtained from a web application store (e.g., Google's Chrome Web Store, or other similar web stores at which applications and browser extensions may be obtained).

In an example embodiment, the client application 22 may therefore include application programming interfaces (APIs) and other web interfaces to enable the client 20 to conduct operations as described herein via the credit extension platform 50 and/or via modification to websites and/or web pages associated with the merchant 23. The client application 22 may include source code for modifying the websites and/or web pages, and may also include links to a series of control consoles or web pages including a landing page, onboarding services, activity feed, account settings (e.g., user profile information), transaction management services, payment management services and the like in cooperation with a service application that may be executed at the credit extension platform 50. Thus, for example, the client application 22 may enable the user or operator (e.g., the customer 21) to connect with the credit extension platform 50 to articulate and submit queries, make credit extension requests, initiate and pay for transactions using funds associated with a credit extension request, and/or the like using the credit extension platform 50 in association with an account (e.g., a user account) that is associated with the customer 21.

In an example embodiment, the application server 42 may include or have access to memory (e.g., internal memory or the database server 44) for storing instructions or applications for the performance of various functions and a corresponding processor for executing stored instructions or applications. For example, the memory may store an instance of the credit extension platform 50 configured to operate in accordance with an example embodiment of the present invention. In this regard, for example, the credit extension platform 50 may include software for enabling the application server 42 to communicate with the network 30 and/or the clients 20 for the provision and/or receipt of information associated with performing activities as described herein. Moreover, in some embodiments, the application server 42 may include or otherwise be in communication with an access terminal such as any one of the clients 20 (e.g., a computer including a user interface) via which individual operators or managers of the entity associated with the facilitation agent may interact with, configure or otherwise maintain the credit extension platform 50. Thus, it should be appreciated that the functions of the credit extension platform 50 can be conducted via client-server based interactions involving communications between clients 20 and the server network 40.

As such, the environment of FIG. 1 illustrates an example in which provision of content and information associated with the financial industry may be accomplished by a particular entity (namely the credit extension platform 50 residing at the application server 42 or at one of the clients 20) via interaction with the client application 22. Thus, the credit extension platform 50 may be configured to handle provision of content and information that are secured as appropriate for the individuals or organizations involved and credentials of individuals or organizations attempting to utilize the tools provided herein may be managed by digital rights management services or other authentication and security services or protocols that are outside the scope of this disclosure.

As noted above, the credit extension platform 50 may operate to enable the user associated with a given one of the clients 20 to setup an account (i.e., the user account) with an entity that operates the credit extension platform 50. After account setup, the user may initiate transactions with various vendors (including merchant 23) and fund the transactions via credit extended by the entity. Notably, account setup may occur prior to the user attempting to initiate any particular transaction, or may occur while the user is in the process of conducting a particular transaction. Thus, for example, the user may already have the user account prior to conducting transactions, or the user may setup the user account while conducting a transaction (or on the way to conducting a transaction).

In an example embodiment, the credit extension platform 50 may enable the user to request an extension of credit, or accept an offer of the extension of credit, in connection with a transaction where the type of financing associated with the extension of credit may include, for example, an installment loan. To accomplish this, the credit extension platform 50 of some example embodiments may conduct determinations regarding credit extension so that, for example, one or more offers of credit may be provided to the user at pre-checkout, while browsing a merchant web page via the browser extension (i.e., via the client application 22), or during the checkout process. As an example, prior to checkout (e.g., including in response to requesting a virtual card, search activities, or browsing of web pages of the merchant 23), the credit extension platform 50 may make a determination as to the creditworthiness of the user and provide information indicating a financing offer (or credit offer) to the user that can be accepted either on the way to checkout or at checkout. The financing offer may be specific to, and generated based on, the merchant 23 (as described in greater detail in reference to FIG. 2 below).

In some example embodiments, a decision model may be provided to guide the ability of the credit extension platform 50 to make a credit extension decision regarding each individual customer (e.g., the customer 21) and/or vendor (e.g., the merchant 23). Example embodiments may also employ machine learning with respect to many different data points associated with the user, the merchant, the type of transaction, or many other pieces of relevant information. The use of machine learning may be tailored to providing the user with financing offers that include payment options that are most likely to be useful to the user.

In some cases, for example, the client application 22 may be used to engage (e.g., via a website and corresponding APIs) with the credit extension platform 50 to select individually available terms associated with a loan product that the user has an interest in employing for purchasing goods or services in connection with an online transaction. The credit extension platform 50 may then be leveraged to perform the analysis described above to determine which financing offers to present to the user for use either pre-checkout or at checkout. If pre-checkout, the financing offer may be accepted and a virtual card, or other purchasing vehicle, may be issued to the customer 21. During checkout, the user (i.e., customer 21) may accept a financing offer via the integrated payment option on the merchant's web page.

In some embodiments, the credit extension platform 50 may effectively conduct a pre-approval of the customer 21 for a financing offer that is associated with (or determined at least in part based on) the creditworthiness of the customer 21. In some cases, the identity of the merchant or the products being financed may also influence details of the financing offer. This approval process may also be conducted in real time at checkout (virtual or physical). The customer 21 may, prior to checkout and/or at checkout, be made aware of the financing offer and various terms associated therewith and, by accepting the financing offer, be issued the virtual card. The virtual card may then be used at checkout to obtain the goods or services being purchased from the merchant 23 with funds being provided (directly or indirectly) to the merchant 23 by the entity associated with the credit extension platform 50, and a loan (e.g., an installment loan) is then instantiated between the user and the entity in association with the user account.

As an alternative to the virtual card, as noted above, another purchasing vehicle may be employed. Alternative purchasing vehicles may take numerous forms. One example embodiment may instantiate the alternative purchasing vehicle in the form of an API that directly interfaces with a backend payment processing system of the merchant 23 to provide an integrated payment option at checkout for the customer 21. In this regard, for example, the merchant 23 and the entity associated with the system 10 may be partners, or have a pre-existing agreement, that enables the merchant 23 to directly obtain payment from the entity responsive to extension of credit by the entity to the customer 21 based on the pre-approval of the customer 21 for the financing offer. The cart of the customer 21 may, e.g., with, a button or selectable interface element, be totaled and transferred to an installment loan with the entity, payment may be received by the merchant 23, and shipment initiated to the customer 21 with a click or interface element selection.

Regardless of how the queries, calculations or modeling activities are initiated, the credit extension platform 50 of FIG. 1 may be used to manage execution of such activities. Each of these activities may have its own respective timing and calculations and communications that are facilitated by the credit extension platform 50 and various components of the credit extension platform 50 may be conducted in parallel. The components, which may be functional modules that operate via API or function calls to respective segmented platforms or a monolith or other collection of rules, policies, instructions, or the like. However, as noted above, the credit extension platform may be augmented to enable the provision of interfaces to enable the customer 21 to make a voluntary down payment.

Figure 2:
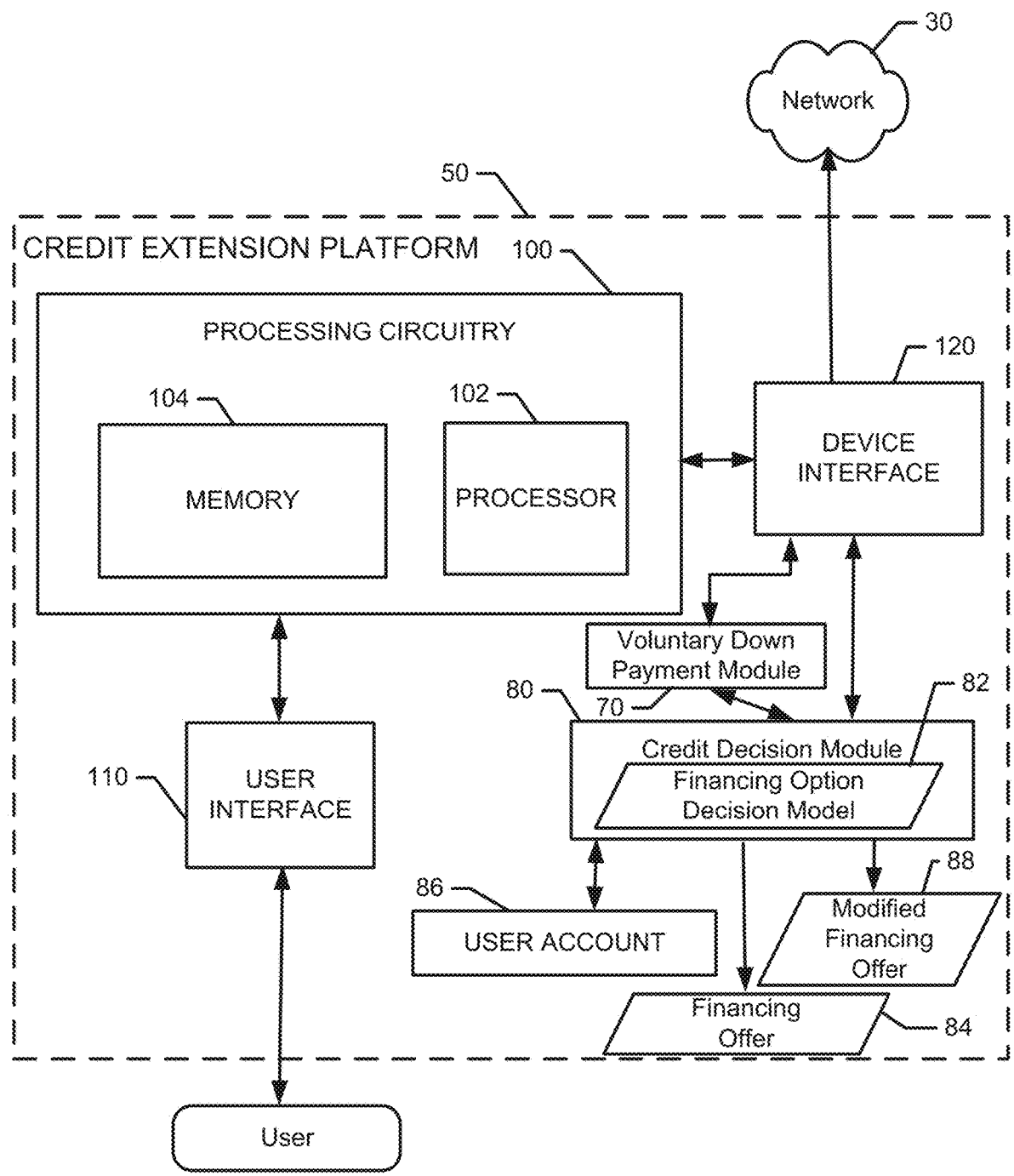
FIG. 2 illustrates a functional block diagram of a credit extension platform according to an example embodiment.

FIG. 2 shows certain elements of an apparatus for provision of the credit extension platform 50 or other processing circuitry according to an example embodiment. The apparatus of FIG. 2 may be employed, for example, as the credit extension platform 50 itself operating at, for example, a network device, server, proxy, or the like (e.g., the application server 42 of FIG. 1)). Alternatively, embodiments may be employed on a combination of devices (e.g., in distributed fashion on a device (e.g., a computer) or a variety of other devices/computers that are networked together). Accordingly, some embodiments of the present invention may be embodied wholly at a single device (e.g., the application server 42) or by devices in a client/server relationship (e.g., the application server 42 and one or more clients 20). Thus, although FIG. 2 illustrates the credit extension platform 50 as including the components shown, it should be appreciated that some of the components may be distributed and not centrally located in some cases. Furthermore, it should be noted that the devices or elements described below may not be mandatory and thus some may be omitted or replaced with others in certain embodiments.

Referring now to FIG. 2, an apparatus for provision of tools, services and/or the like for facilitating decision making regarding extensions of credit is shown. In this regard, the credit extension platform 50 may be configured to perform analysis, modeling, or other determinations based on the signaling and/or the information provided to determine whether a financial transaction or loan can be underwritten according to a selected type of financing option (e.g., an installment loan) and, if so, what financing offers to extend to the user receiving an affirmative result in such determinations. The apparatus may be an embodiment of the credit extension platform 50 or a device or component thereof including, for example, a voluntary down payment module 70 that may operate in association with a credit decision module 80. As such, configuration of the apparatus as described herein may transform the apparatus into the credit extension platform 50. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device (e.g., memory 104) and a processor 102 that may be in communication with or otherwise control a user interface 110 and a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In some embodiments, the processor 102 may be embodied as a central processing unit (CPU) or a graphics processing unit (GPU). In situations where the processing circuitry 100 is embodied as a server or at a remotely located computing device, the user interface 110 may be disposed at another device (e.g., at a computer terminal) that may be in communication with the processing circuitry 110 via the device interface 120 and/or a network (e.g., network 30). Thus, in some cases, the connection of the user to the user interface 110 may actually occur via the network 30.

The user interface 110 may be in communication with the processing circuitry 100 to receive an indication of a user input at the user interface 110 and/or to provide an audible, visual, mechanical or other output to the user. As such, the user interface 110 may include, for example, a keyboard, a mouse, a joystick, a display, a touch screen, a microphone, a speaker, augmented/virtual reality device, or other input/output mechanisms. In embodiments where the apparatus is embodied at a server or other network entity, the user interface 110 may be limited or even eliminated in some cases. Alternatively, the user interface 110 may be remotely located. In some cases, the user interface 110 may be located at one of the clients 20 of FIG. 1.

The device interface 120 may include one or more interface mechanisms for enabling communication with other devices and/or networks. In some cases, the device interface 120 may be any means such as a device or circuitry embodied in either hardware, software, or a combination of hardware and software that is configured to receive and/or transmit data from/to a network (e.g., network 30) and/or any other device or module in communication with the processing circuitry 100. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network, the network 30 may be any of various examples of wireless or wired communication networks such as, for example, data networks like a Local Area Network (LAN), a Metropolitan Area Network (MAN), and/or a Wide Area Network (WAN), such as the Internet, as described above.

In an example embodiment, the memory 104 may include one or more non-transitory storage or memory devices such as, for example, volatile and/or non-volatile memory that may be either fixed or removable. The memory 104 may be configured to store information, data, applications, instructions or the like for enabling the apparatus to carry out various functions in accordance with example embodiments of the present invention. For example, the memory 104 could be configured to buffer input data for processing by the processor 102. Additionally or alternatively, the memory 104 could be configured to store instructions for execution by the processor 102. As yet another alternative, the memory 104 may include one of a plurality of databases (e.g., database server 44) that may store a variety of files, contents or data sets. Among the contents of the memory 104, applications (e.g., a service application configured to interface with the client application 22) may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the memory 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the voluntary down payment module 70 an the credit decision module 80, each of which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the voluntary down payment module 70 and the credit decision module 80, respectively, as described below.

The credit decision module 80 may be configured to include tools to facilitate execution of a transactional-based credit extension decision based on a financing option decision model 82. The tools may be provided in the form of various modules (or submodules) that may be instantiated by configuration of the processing circuitry 100. The financing option decision model 82 may include tables, algorithms and/or the like that define decision making parameters based on the inputs provided thereto. The inputs may include many different signals that may be used to balance risks associated with extending credit to a user (or a device from which a credit extension request is received that purports to be associated with the user). These signals typically include identity information indicating an identity of the user, and other information enabling a check of a credit score of the user, information descriptive of the transaction itself or items (e.g., a stock-keeping unit (SKU) or other code used to track products at the individual product level), price and other parameters associated with the transaction. Other signals may also be used including information associated with the current and past transactions between the user and the entity that operates the credit extension platform 50 and/or any other relationship or other information that may inform the decision making process for selecting the form and structure of the financing offers. In this regard, for example, information indicative of most likely preferred options for the user (which may be learned by the machine learning component) may be used. The financing option decision model 82 may also include tables, algorithms and/or the like that enable computation (by the credit decision module 80) of a credit limit that is suggested for the customer 21 and/or specific financing offers (e.g., including a term or details regarding the number, size and pace of repayments that are to be made) based on all of the other inputs received. The credit limit given (or suggested) and/or the financing offers made by the credit decision module 80 may therefore be made based on live signaling and the financing option decision model 82.

In any case, the credit decision module 80 may be configured to determine, based on the creditworthiness of the customer 21 or other identifying information about the customer 21, and in some cases based on merchant identity or type or terms, a pre-authorized or approved financing offer 84, which may be communicated to the customer 21 (e.g., via the client application 22). The approved financing offer 84 may then be reviewed and accepted by the customer 21 through an exchange of information between the client application 22 and the credit extension platform 50. However, as noted above, the financing offer 84 may also be modified by the provision of a voluntary down payment, which may be provided via the voluntary down payment module 70.

In this regard, for example, when a user indicates their interest in using financing (either pre-checkout or during checkout as described above), a user account 86 may be created for the customer 21. The creation of the user account 86 may require submission (or confirmation) of information such as the name and other information of the individual associated with the customer 21, billing address, account information for checking, savings or other accounts from which payments may be extracted to receive the financing offer 84. In some cases, the customer 21 may already have a user account 86, in which case the customer 21 may simply log in or authenticate within the system to access and utilize financing and receive the financing offer 84. However, as noted above, in some cases the customer may not accept the financing offer 84 as presented, and may wish to modify the financing offer by making a voluntary down payment. In an example embodiment, the voluntary down payment module 70 may interact with the financing offer 84 to modify the amount being financed based on the provision of a voluntary down payment. The credit decision module 80 may then modify the terms of the financing offer 84 offered to generate a modified financing offer 88, which accounts for the voluntary down payment. The modified financing offer 88 may be generated and communicated to the client application 22 for consideration and acceptance by the customer 21 in purchasing goods or services from the merchant 23. If accepted, and if used to purchase the goods or services, a loan (e.g., an installment loan or conventional loan) may be created in accordance with the modified financing offer 88.

Figure 3:
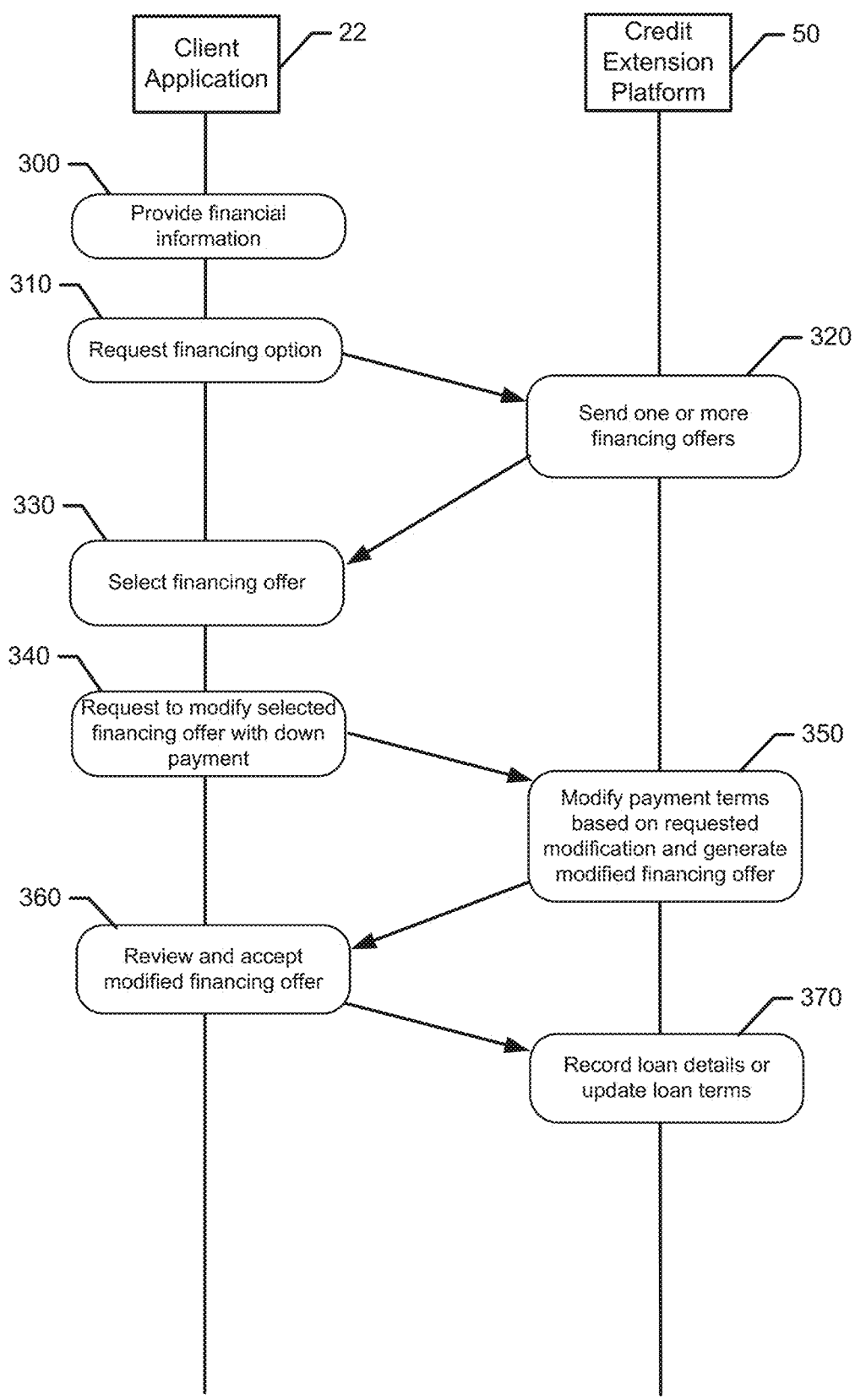
FIG. 3 illustrates a control flow diagram showing an example of communications and activities associated with the credit extension platform operating in accordance with an example embodiment.

FIG. 3 illustrates an example control flow diagram of an example embodiment. As shown in FIG. 3, an example of the client application 22 at an instance of the customer 21 may provide financial information at operation 300 and provide a request for a financing option at operation 310. The financial information may include identity information for the customer 21, login information for the user account 86, merchant identity information, cart information, and/or the like. In some cases, operations 300 and 310 may effectively form (or include) a credit application. Thus, the client application 22 may either interface with the credit decision module 80 in real time, or rely on stored information received from the credit extension platform 50, to request one or more financing offers that may be associated with a transaction (e.g., with a merchant) via a credit application. The credit extension platform 50 may then use the information provided, as described above, to identify and send one or more financing offers to the customer 21 at operation 320. It can be assumed in this example that the credit extension platform 50 has approved or pre-approved the customer 21 for each of the financing offers that is sent at operation 320, and therefore also that the credit application is approved. At operation 330, the customer 21 may select one of the financing offers. The selected financing offer may include a given number of payments over a given period of time, or could include conventional loan details like the interest rate and minimum payment amount and/or frequency.

At operation 340, the customer 21 may (via the client application 22) request to modify the selected financing offer by making a voluntary down payment. In some cases, the voluntary down payment request from the customer may in the form of a percentage of the total purchase they wish to put down or an exact dollar amount. Additionally, the client application 22 may be configured to give an estimated adjustment of modified payment terms in real-time as the customer inputs the voluntary down payment request. Upon receipt, the credit extension platform 50 may modify the payment terms based on the requested modification, and may generate a modified financing offer at operation 350. The modified financing offer may show the modified amount of payments based on the adjusted loan principal or amount. Generally, the same number of payments that were defined in the selected financing offer may be retained. After receiving the modified financing offer, the client application 22 may be used to review and accept the modified financing offer at operation 360. The credit extension platform 50 may thereafter record loan details or update loan terms and originate the loan (including transferring funds to the merchant) at operation 370.

Figure 4:
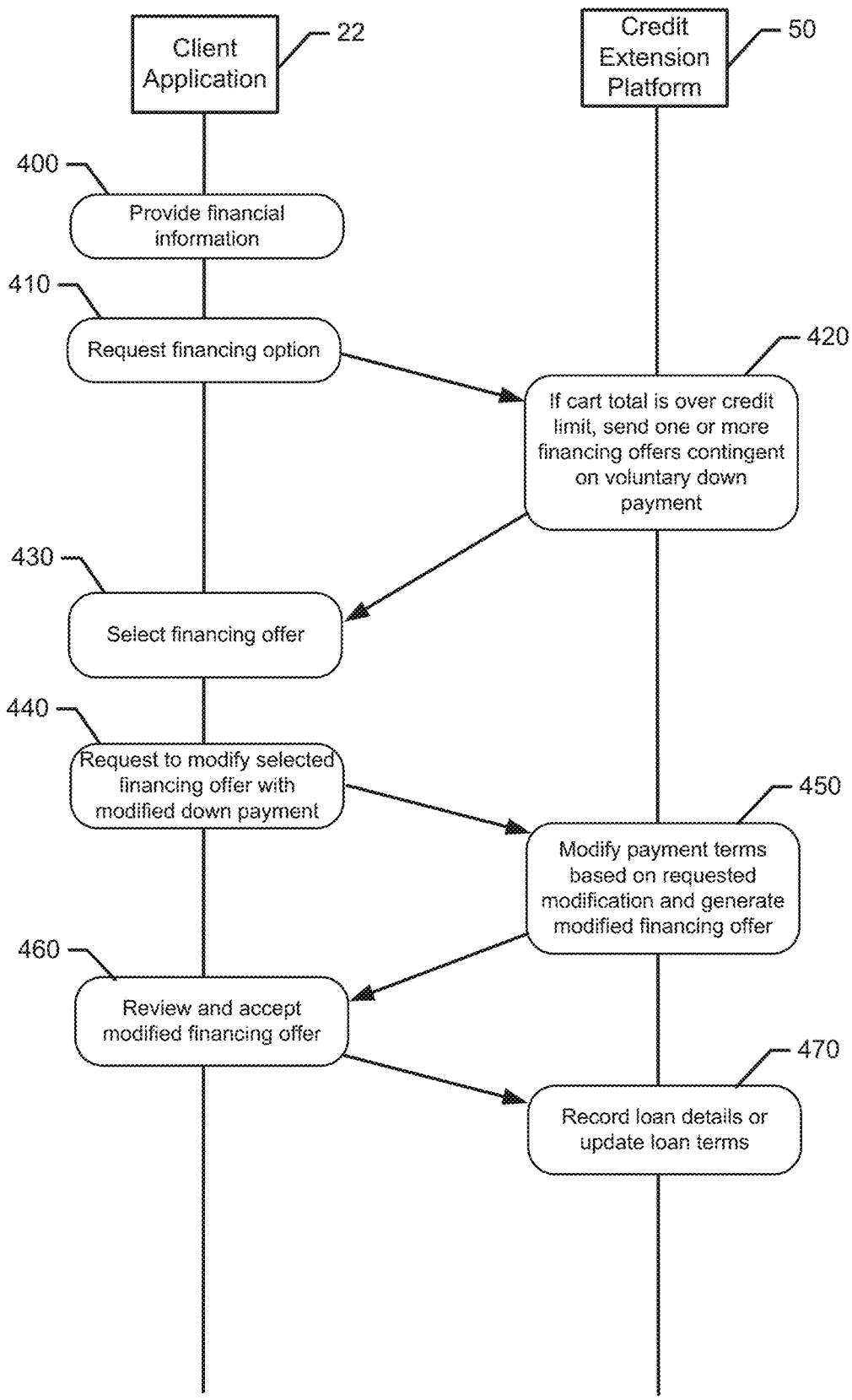
FIG. 4 illustrates a control flow diagram showing an example of communications and activities associated with the credit extension platform enabling a transaction via a down payment in accordance with an example embodiment

The process of FIG. 3 may generally be followed in some example embodiments. However, some modifications may be made and still be consistent with example embodiments. In this regard, the communications shown in FIG. 3 may happen in real-time via a web browser or internet application, but need not necessarily be so. Communications could alternatively happen via SMS or email, and may be conducted in advance of the transaction for which the loan is to be obtained (e.g., based on a prequalified credit limit). Push messages or notifications could also be used for some messaging, and to follow up on pre-qualification loans for which no transaction has occurred for a given time after the loan terms are agreed upon. Other changes may also be included such as, for example, the request for a financing option may be associated with a loan amount that would be above the credit limit of the customer 21. In such cases, the ability to provide a voluntary down payment may also be used to allow the customer 21 to make a voluntary payment that then brings the financed total down below the amount of the credit limit. Thus, the voluntary down payment may actually be enabling for obtaining financing in some cases. FIG. 4 illustrates an example in which the voluntary down payment functionality is used to enable a loan to be originated where it otherwise would not have been possible.

Referring now to FIG. 4, operations 400 and 410 may be similar to the operations 300 and 310, respectively, of FIG. 3. However, as noted at operation 420, when the cart total is over the credit limit determined by the credit extension platform 50 a different response may be enabled other than the typical denial of the credit application. In this regard, for example, the credit extension platform 50 may offer financing to the customer 21 up to the amount of the credit limit on the condition that the customer make a voluntary down payment in the amount of the difference between the cart total and the credit limit. In some cases, this functionality may only be allowed if the difference between the cart total and the credit limit is within a predetermined threshold (e.g., the overage of the cart total may not be allowed to be more than a fixed percentage such as 10% or 20% of the credit limit).

Thereafter, the client application 22 may either interface with the credit extension platform 50 to receive one or more financing offers, and the customer 21 may select one of the financing offers at operation 430. The selected financing offer may include a given number of payments over a given period of time, or could include conventional loan details like the interest rate and minimum payment amount and/or frequency. This offer may simply be accepted at operation 460, and the loan can be originated at operation 470. However, the customer 21 could alternatively (via the client application 22) request to modify the selected financing offer by making a down payment at operation 440, and implement similar functionality to that described above in reference to FIG. 3. If operation 440 is executed, then credit extension platform 50 may modify the payment terms based on the requested modification, and may generate a modified financing offer at operation 450 before proceeding to operations 460 and 470.

Figure 5:
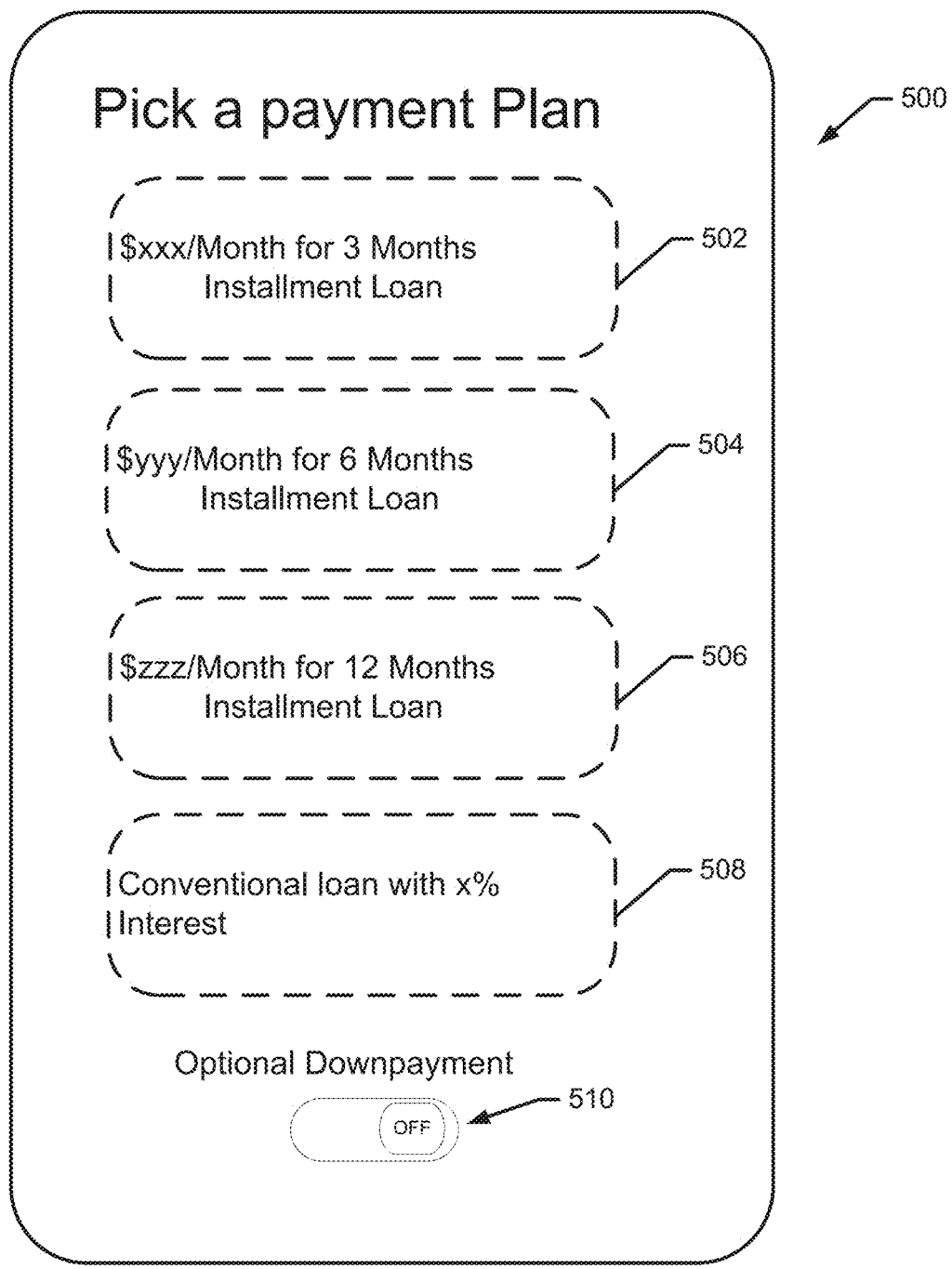
FIG. 5 illustrates a web page showing an interface for selecting a financing option with optional down payment not selected in accordance with an example embodiment.

FIG. 5 illustrates a web page 500 or smart phone display screen showing search results modified to include an interface element in accordance with an example embodiment. In this regard, FIG. 5 shows a plurality of financing offers (e.g., a first financing offer 502, a second financing offer 504, a third financing offer 506 and a fourth financing offer 508) displayed on the web page 500. Each of the first, second and third financing offers 502, 504 and 506 is an example of an installment loan with a fixed payment amount split over a different term length (e.g., three, six and twelve months, respectively). Meanwhile, the fourth financing offer 508 is an example of a conventional interest bearing loan to illustrate the potential for example embodiments to apply to installment loans, conventional loans, or combinations thereof.

Figure 6:
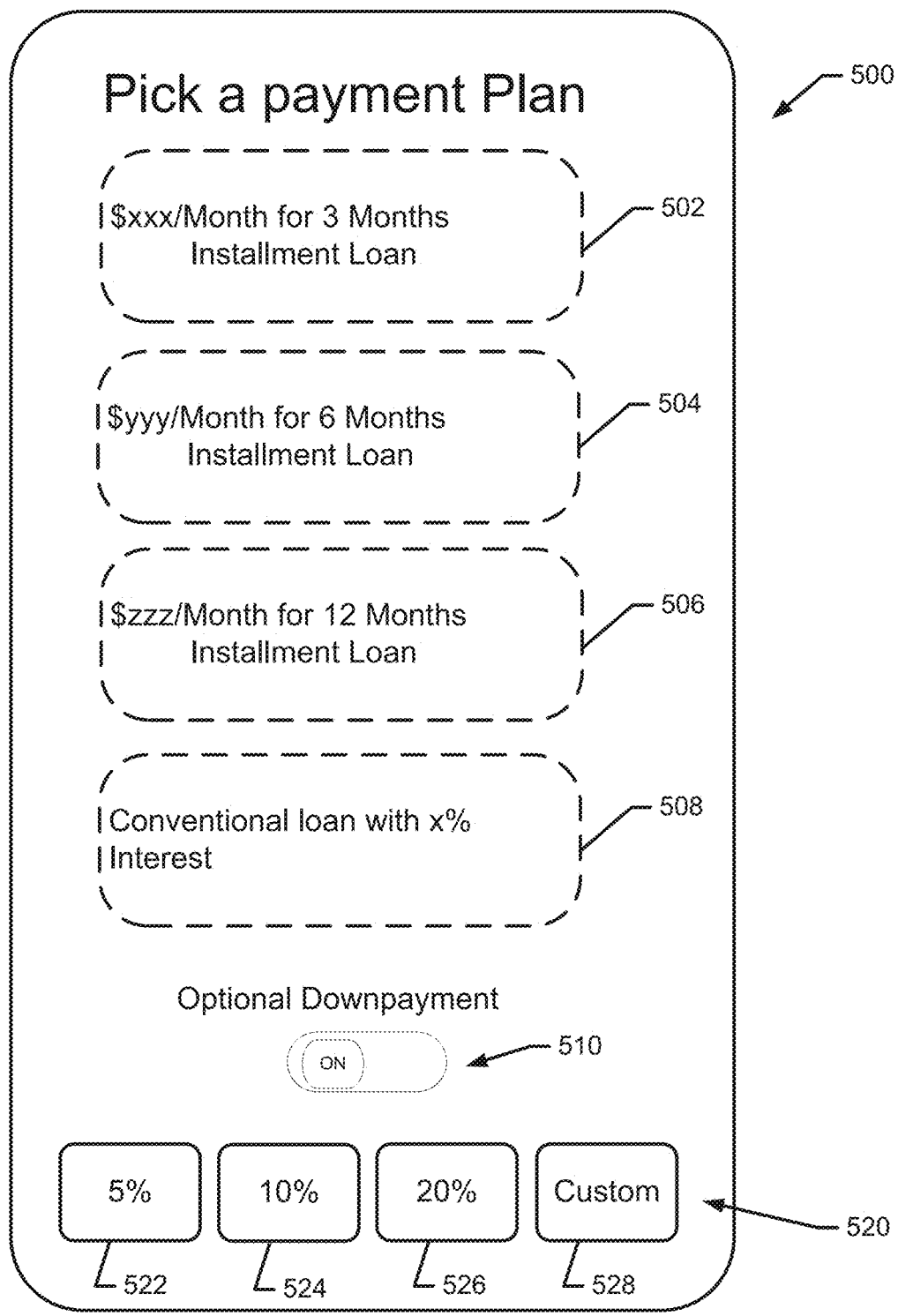
FIG. 6 illustrates a web page showing an interface for selecting a financing option with optional down payment selected in accordance with an example embodiment.

FIG. 5 also illustrates a down payment option selector 510. The down payment option selector 510 of this example is a toggle switch that is slidable between two states (e.g., ON and OFF), with the OFF state shown in FIG. 5. Meanwhile, FIG. 6 shows a provision of a down payment selector interface 520 that may appear when the down payment option selector 510 is toggled to the ON state. The down payment selector interface 520 may include multiple selectable options for selecting a down payment amount. In the example shown, a first down payment option 522, a second down payment option 524, and a third down payment option 526 each provide a respective different fixed percentage of the cart total that will be paid immediately as a down payment. Meanwhile, a fourth down payment option 528 is a custom down payment selection option, which may enable the customer 21 to pick from among a plurality of non-fixed amounts.

Figure 7:
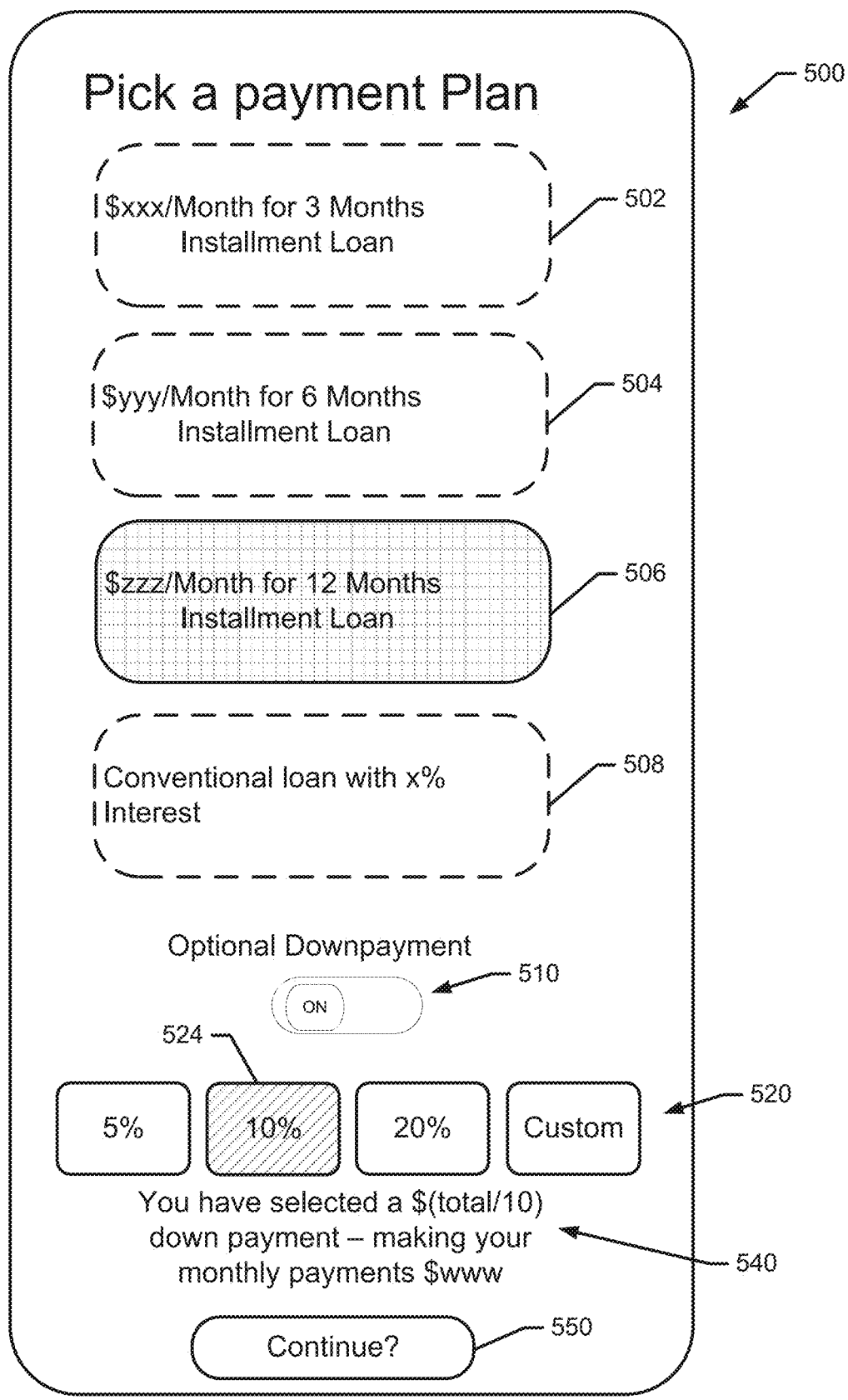
FIG. 7 illustrates a display of modified payment information responsive to selecting a fixed down payment option in accordance with an example embodiment.

FIG. 7 illustrates an example in which the customer 21 has selected the third financing offer 506, which nominally computed an even twelve monthly payments for an installment loan. An amount of the corresponding monthly payment is listed in the third financing offer 506 (which is $zzz in this example). The customer 21 then, since the down payment option selector 510 was toggled to the ON state, was able to select the second down payment option 524, which prescribes a 10% down payment in this example. By making a 10% down payment, of course, the financed amount will be reduced by a corresponding amount, and the monthly payments will be reduced also by around 10%. Thus, responsive to selection of the down payment amount, a modified payment amount 540 may be displayed to the customer 21. If the customer 21 is willing to accept the modified payment amount 540, the customer 540 may select continue button 550, which may signify acceptance of the offer. In some cases, various truth in lending, or other legal disclosures may also be provided thereafter for review and acceptance by the customer 21. When final acceptance is made, the loan may be originated according to the agreed upon terms.

Figure 8:
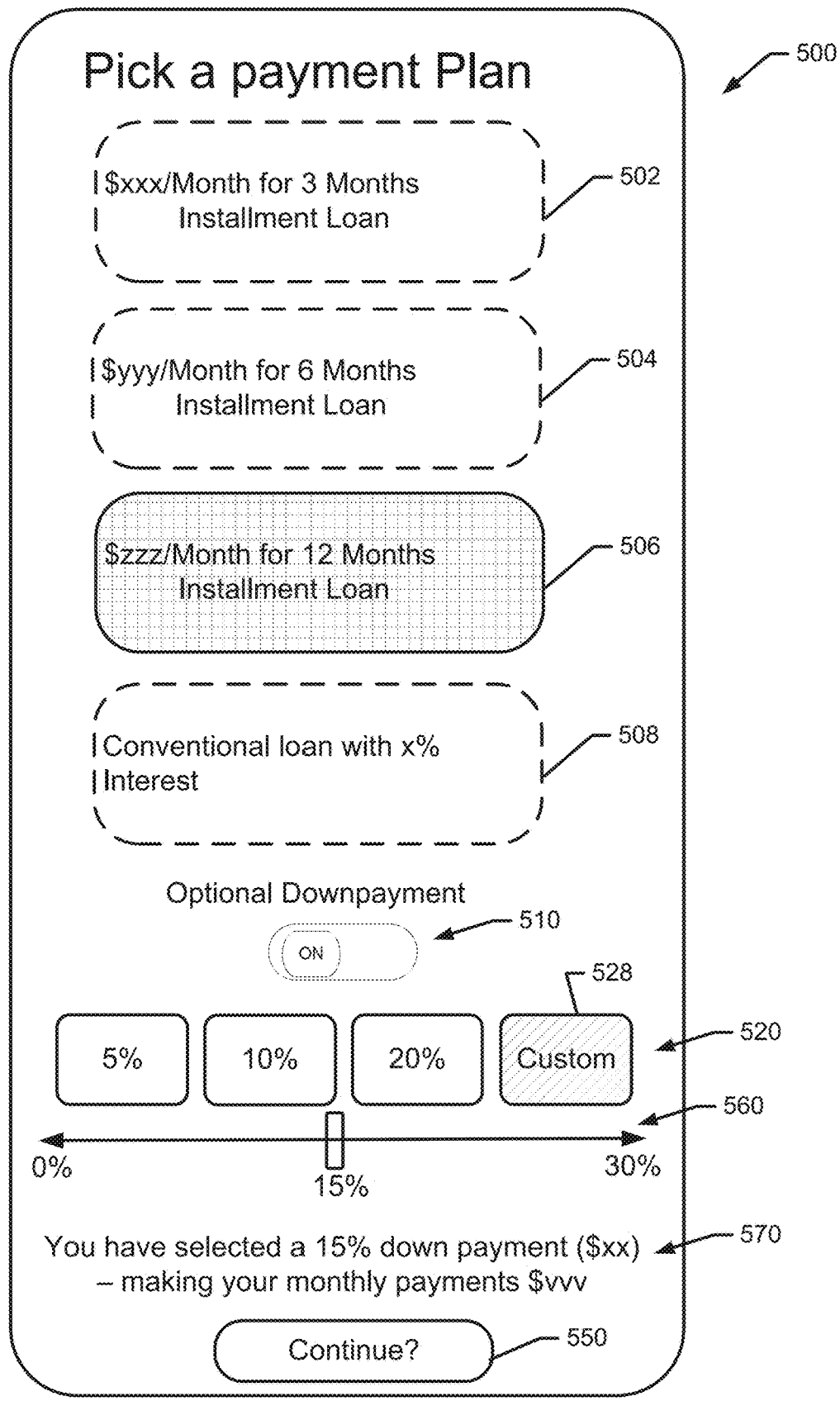
FIG. 8 illustrates a display of modified payment information responsive to selecting a non-fixed down payment option in accordance with an example embodiment.

FIG. 8 shows a similar work flow to that of FIG. 7 except that the fourth down payment option 528 was selected by the customer 21. Responsive to selection of the fourth down payment option 528, a selection interface (e.g., slider bar 560) may be provided to the customer 21. The customer 21 may then move the selection interface to a desired down payment value. Meanwhile, simultaneously with movement of the slider bar 560, a dynamic modified payment amount 570 may be displayed to show the amount of each monthly payment the customer 21 would expect to pay for the corresponding desired down payment value that is currently displayed based on the position of the slider bar 560. Notably, although FIGS. 5-8 show the down payment option selector 510 appearing on the same page as the presentation of the financing offers, the down payment option selector 510 could alternatively be provided on a separate page.

Figure 9:
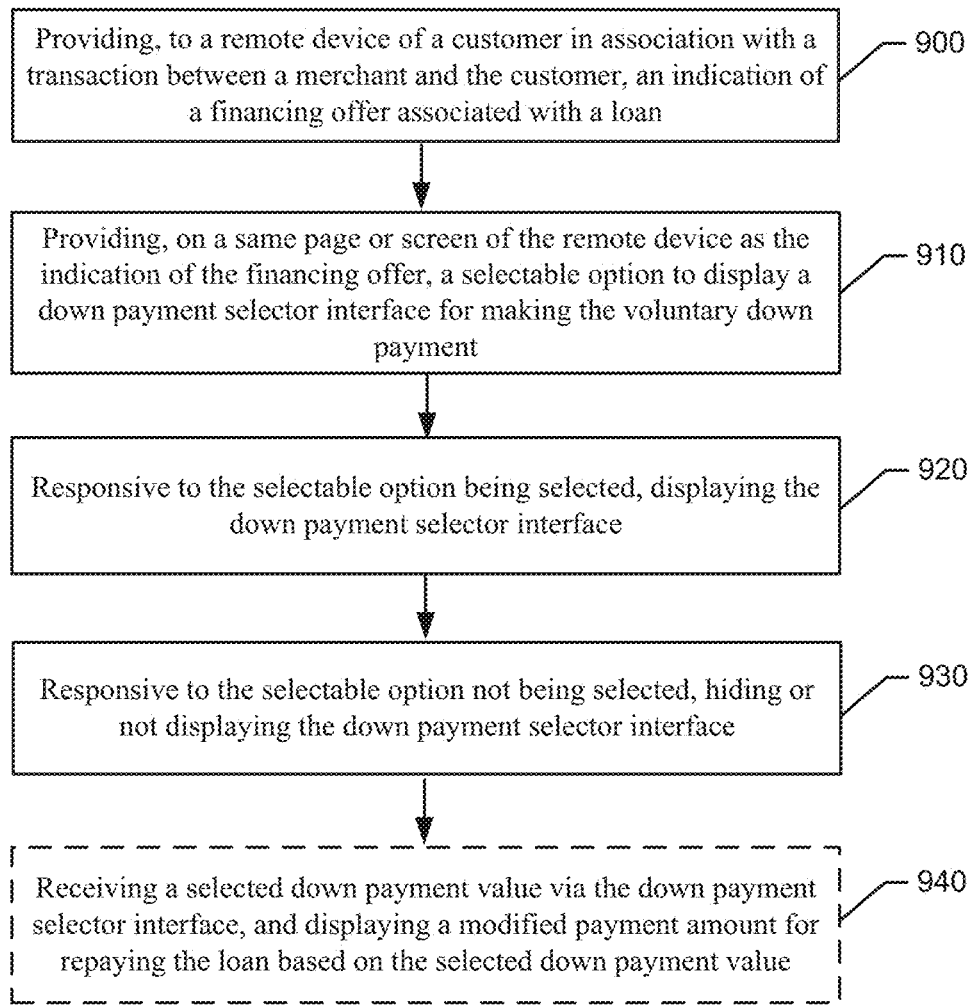
FIG. 9 illustrates a block diagram of a method for providing a voluntary down payment interface in association with a financing offer in accordance with an example embodiment.

From a technical perspective, the credit extension platform 50 and/or the browser extension 400 described above may be used to support some or all of the operations described above. As such, the apparatuses described in FIGS. 2 and 3 may be used to facilitate the implementation of several computer program and/or network communication based interactions. As an example, FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of providing a voluntary down payment interface in association with a financing offer is shown in FIG. 9. The method may include providing, to a remote device of a customer in association with a transaction between a merchant and the customer, an indication of a financing offer associated with a loan at operation 900. The method may further include providing, on a same page or screen of the remote device as the indication of the financing offer, a selectable option to display a down payment selector interface for making the voluntary down payment at operation 910. The method may also include, responsive to the selectable option being selected, displaying the down payment selector interface at operation 920, and, responsive to the selectable option not being selected, hiding or not displaying the down payment selector interface at operation 930. In some embodiments, the method may further include an optional operation 940 of receiving a selected down payment value via the down payment selector interface, and displaying a modified payment amount for repaying the loan based on the selected down payment value.

In an example embodiment, an apparatus for performing the method of FIG. 9 above may comprise a processor (e.g., the processor 102) or processing circuitry configured to perform some or each of the operations (900-940) described above. The processor may, for example, be configured to perform the operations (900-940) by performing hardware implemented logical functions, executing stored instructions, or executing algorithms for performing each of the operations. In some embodiments, the processor or processing circuitry may be further configured for additional operations or optional modifications to operations 900 to 940.

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, the displaying the down payment selector interface may include displaying the down payment selector interface on the same page or screen of the remote device as the indication of the financing offer. In an example embodiment, providing the indication of the financing offer may include displaying a payment amount and term for repaying the loan according to the financing offer. In some cases, the selectable option may include a slidable toggle switch displayed to be alternately turned on or off by the customer. In an example embodiment, the down payment selector interface may include a plurality of selectable options for down payment values, and the selectable options may include different fixed percentage values of a total cart value of the transaction. In some cases, the down payment selector interface may include a custom down payment selection option configured to enable the customer to pick from among a plurality of non-fixed down payment amounts. In an example embodiment, selection of the custom down payment selection option may generate a slider bar via which one of the plurality of non-fixed down payment amounts is selectable. In some cases, the transaction is a future transaction (meaning the loan is a pre-approval) or a current transaction (meaning the loan is being secured in real time to support financing the transaction). The loan may be an installment loan or a conventional interest bearing loan. In some cases, the customer may initially be denied the loan due to an amount of the transaction exceeding a credit limit of the customer, and the loan may ultimately be granted responsive to the customer making the voluntary down payment to reduce a financed amount of the transaction to at least the credit limit.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for providing a voluntary down payment interface in association with a financing offer, the method comprising:
   providing, to a remote device of a customer in association with a transaction between a merchant and the customer, an indication of the financing offer associated with a loan;
   providing, on a same page or screen of the remote device as the indication of the financing offer, a slidable two state selector to define a graphically displayed selectable option to display a down payment selector interface for making the voluntary down payment;
   responsive to the selectable option being selected, displaying the down payment selector interface separately from the slidable two state selector on the same page or screen of the remote device as the indication of the financing offer; and
   responsive to the selectable option not being selected, hiding or not displaying the down payment selector interface,
   wherein the financing offer is one of a plurality of financing offers of respective different loan types that are all shown on the same page simultaneously with the slidable two state selector both when the selectable option is selected and not selected, but when the selectable option is selected, then the plurality of financing offers of respective different loan types are all shown on the same page simultaneously with the slidable two state selector and the down payment selector.

2. The method of claim 1, wherein providing the indication of the financing offer comprises displaying a payment amount and term for repaying the loan according to the financing offer.

3. The method of claim 2, further comprising receiving a selected down payment value via the down payment selector interface, and displaying a modified payment amount for repaying the loan based on the selected down payment value.

4. The method of claim 1, wherein the selectable option comprises a slidable toggle switch displayed to be alternately turned on or off by the customer.

5. The method of claim 1, wherein the down payment selector interface comprises a plurality of selectable options for down payment values, and
   wherein the selectable options include different fixed percentage values of a total cart value of the transaction.

6. The method of claim 1, wherein the down payment selector interface comprises a custom down payment selection option configured to enable the customer to pick from among a plurality of non-fixed down payment amounts.

7. The method of claim 6, wherein selection of the custom down payment selection option generates a slider bar via which one of the plurality of non-fixed down payment amounts is selectable.

8. The method of claim 1, wherein the transaction is a future transaction or a current transaction.

9. The method of claim 1, wherein the loan is an installment loan.

10. An apparatus for providing a voluntary down payment interface in association with a financing offer, the apparatus comprising processing circuitry configured to:
    provide, to a remote device of a customer in association with a transaction between a merchant and the customer, an indication of a financing offer associated with a loan;
    provide, on a same page or screen of the remote device as the indication of the financing offer, a slidable two state selector to define a graphically displayed selectable option to display a down payment selector interface for making the voluntary down payment;
    responsive to the selectable option being selected, display the down payment selector interface separately from the slidable two state selector on the same page or screen of the remote device as the indication of the financing offer; and
    responsive to the selectable option not being selected, hide or not display the down payment selector interface,
    wherein the financing offer is one of a plurality of financing offers of respective different loan types that are all shown on the same page simultaneously with the slidable two state selector both when the selectable option is selected and not selected, but when the selectable option is selected, then the plurality of financing offers of respective different loan types are all shown on the same page simultaneously with the slidable two state selector and the down payment selector.

11. The apparatus of claim 10, wherein providing the indication of the financing offer comprises displaying a payment amount and term for repaying the loan according to the financing offer.

12. The apparatus of claim 11, wherein the processing circuitry is further configured for receiving a selected down payment value via the down payment selector interface, and displaying a modified payment amount for repaying the loan based on the selected down payment value.

13. The apparatus of claim 10, wherein the selectable option comprises a slidable toggle switch displayed to be alternately turned on or off by the customer.

14. The apparatus of claim 10, wherein the down payment selector interface comprises a plurality of selectable options for down payment values, and
    wherein the selectable options include different fixed percentage values of a total cart value of the transaction.

15. The apparatus of claim 10, wherein the down payment selector interface comprises a custom down payment selection option configured to enable the customer to pick from among a plurality of non-fixed down payment amounts.

16. The apparatus of claim 15, wherein selection of the custom down payment selection option generates a slider bar via which one of the plurality of non-fixed down payment amounts is selectable.

17. The apparatus of claim 10, wherein the transaction is a future transaction or a current transaction, and wherein the loan is an installment loan.

18. The apparatus of claim 10, wherein the customer is initially denied the loan due to an amount of the transaction exceeding a credit limit of the customer, and
    wherein the loan is granted responsive to the customer making the voluntary down payment to reduce a financed amount of the transaction to at least the credit limit.

* * * * *